US007011437B2

(12) United States Patent
Goller

(10) Patent No.: US 7,011,437 B2
(45) Date of Patent: *Mar. 14, 2006

(54) LIGHT SHIELD MOUNTING FOR AUTOMOTIVE HEADLAMP

(75) Inventor: Jon P. Goller, Heltonville, IN (US)

(73) Assignee: Valeo Sylvania L.L.C., Seymour, IN (US)

( * ) Notice: Subject to any disclaimer, the term of this patent is extended or adjusted under 35 U.S.C. 154(b) by 222 days.

This patent is subject to a terminal disclaimer.

(21) Appl. No.: 10/778,775

(22) Filed: Feb. 13, 2004

(65) Prior Publication Data

US 2005/0180143 A1 Aug. 18, 2005

(51) Int. Cl.
*B60Q 1/04* (2006.01)

(52) U.S. Cl. ........................................ 362/507; 362/539

(58) Field of Classification Search ................ 362/296, 362/298, 351–353, 343, 344, 303, 305, 280, 362/426, 433, 459, 487, 507, 509, 514, 523, 362/524, 528, 359, 362

See application file for complete search history.

(56) References Cited

U.S. PATENT DOCUMENTS 6,203,177 B1 * 3/2001 Watanabe et al. ........... 362/351
6,644,840 B1 * 11/2003 Yagi et al. .................. 362/510

* cited by examiner

*Primary Examiner*—Renee Luebke
*Assistant Examiner*—Khanh H. Le
(74) *Attorney, Agent, or Firm*—William E. Meyer

(57) ABSTRACT

A lamp unit has a reflector (10) having a reflector surface (12) with an inverted U-shaped aperture (14) formed therein and extending through said reflector to an opposite surface (16). The inverted U-shaped aperture thereby has a bight (18) uppermost with a pair of channels (20, 22) depending therefrom. A light-shield (24) comprises a cup-shaped member (26) having an arm (28) projecting therefrom. The arm (28) has a distal end (30) formed to provide a pair of nibs (32, 34) for engaging and penetrating the channels (20, 22) of the inverted U-shaped aperture (14). The nibs (32, 34) have their ends (36, 38) deformed to fix the position of the light-shield (24) relative to the reflector (10).

5 Claims, 10 Drawing Sheets

LIGHT SHIELD MOUNTING FOR AUTOMOTIVE HEADLAMP

TECHNICAL FIELD

This invention relates to lamp units and more particularly to automotive headlamps. Still more particularly it relates to a reflector and shield for an automotive headlamp unit.

BACKGROUND ART

Automotive headlamps employ small light sources arranged in a reflector. It is common practice to cover the forwardmost facing part of the light source with a cup-shaped shield. Mounting the shield is a continuing problem usually solved by having an arm on the shield having a distal end that is fixed to the reflector at a remote location, usually by a screw or by a pressed-in fit. Use of the screw introduces an extra part raising the cost while the pressed-in feature allows the shield to fall out if it is not properly engaged.

DISCLOSURE OF INVENTION

It is, therefore, an object of the invention to obviate the disadvantages of the prior art.

It is another object of the invention to enhance light shields in automotive headlamps.

These objects are accomplished, in one aspect of the invention, by the provision of a lamp unit comprising: a reflector having a reflector surface with an inverted U-shaped aperture formed therein and extending through said reflector to an opposite surface, said inverted U-shaped aperture thereby having the bight uppermost with a pair of channels depending therefrom; and a light-shield comprising a cup-shaped member having an arm projecting therefrom, said arm having a distal end formed to provide a pair of nibs for engaging and penetrating said channels of said inverted U-shaped aperture and having their ends deformed to fix the position of said light-shield relative to said reflector.

Deforming the nibs provides more than adequate fixation for the shield and eliminates the need for a screw or other separate holding device or dependence upon a mere friction fit.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Figure 1:
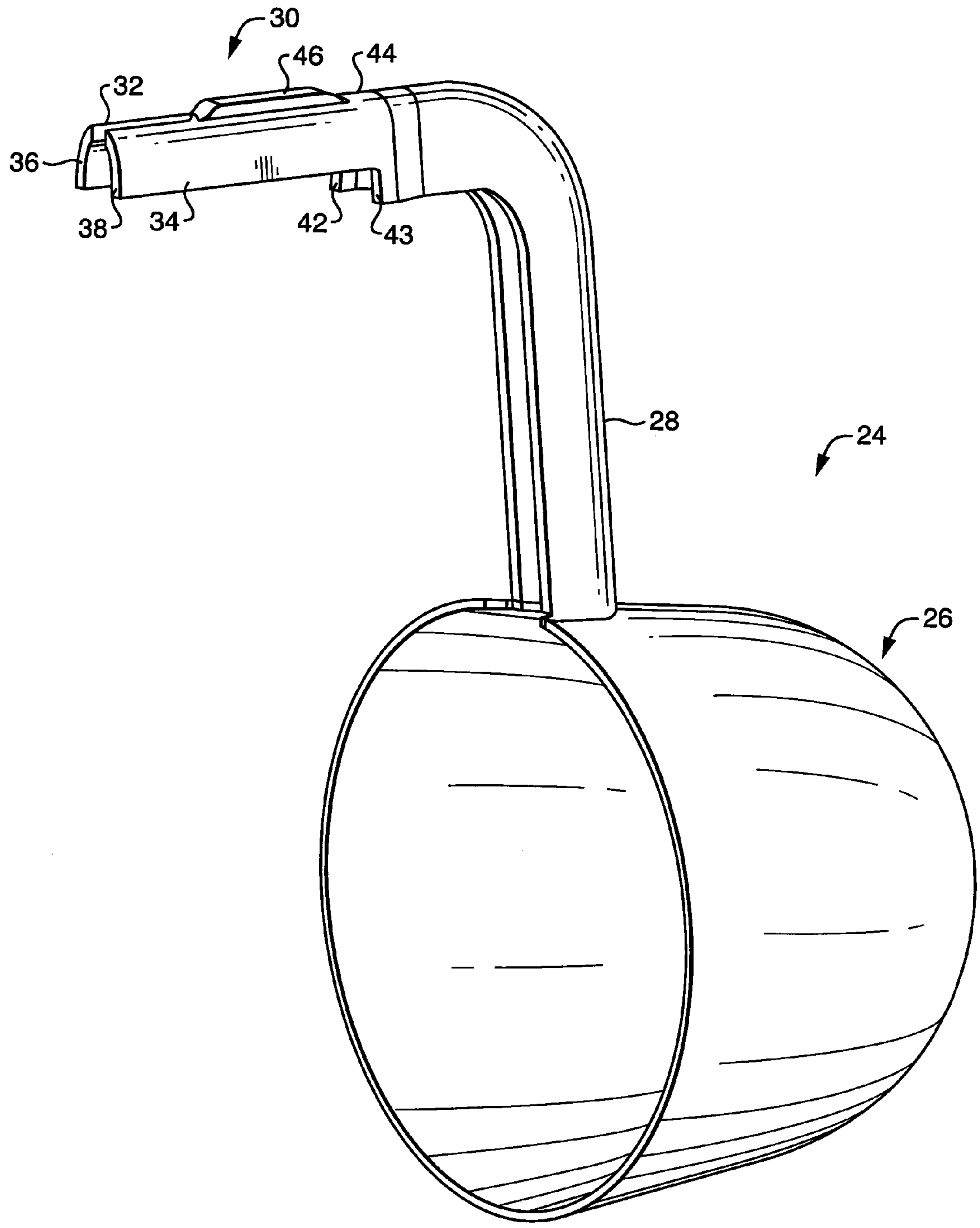
FIG. 1 is a perspective view of a shield in accordance with an aspect of the invention.

Referring now to the drawings with greater particularity, there is shown in FIG. 1 a light-shield 24 having a cup-shaped member 26 with an arm 28 projecting therefrom. The arm 28 has a distal end 30 formed to provide nibs 32, 34 having ends 36, 38.

Figure 3:
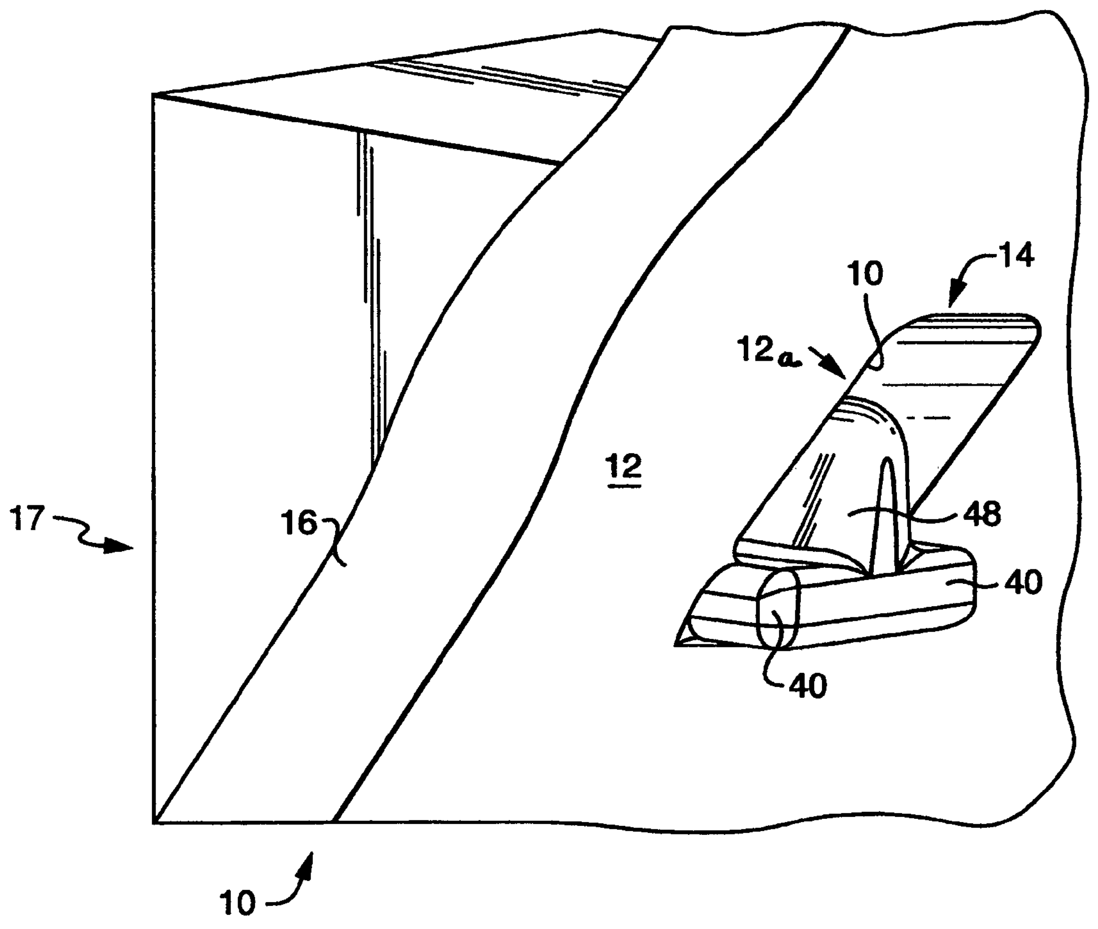
FIG. 3 is a perspective view of the front or reflector surface side of an aperture formed in the reflector.
Figure 4:
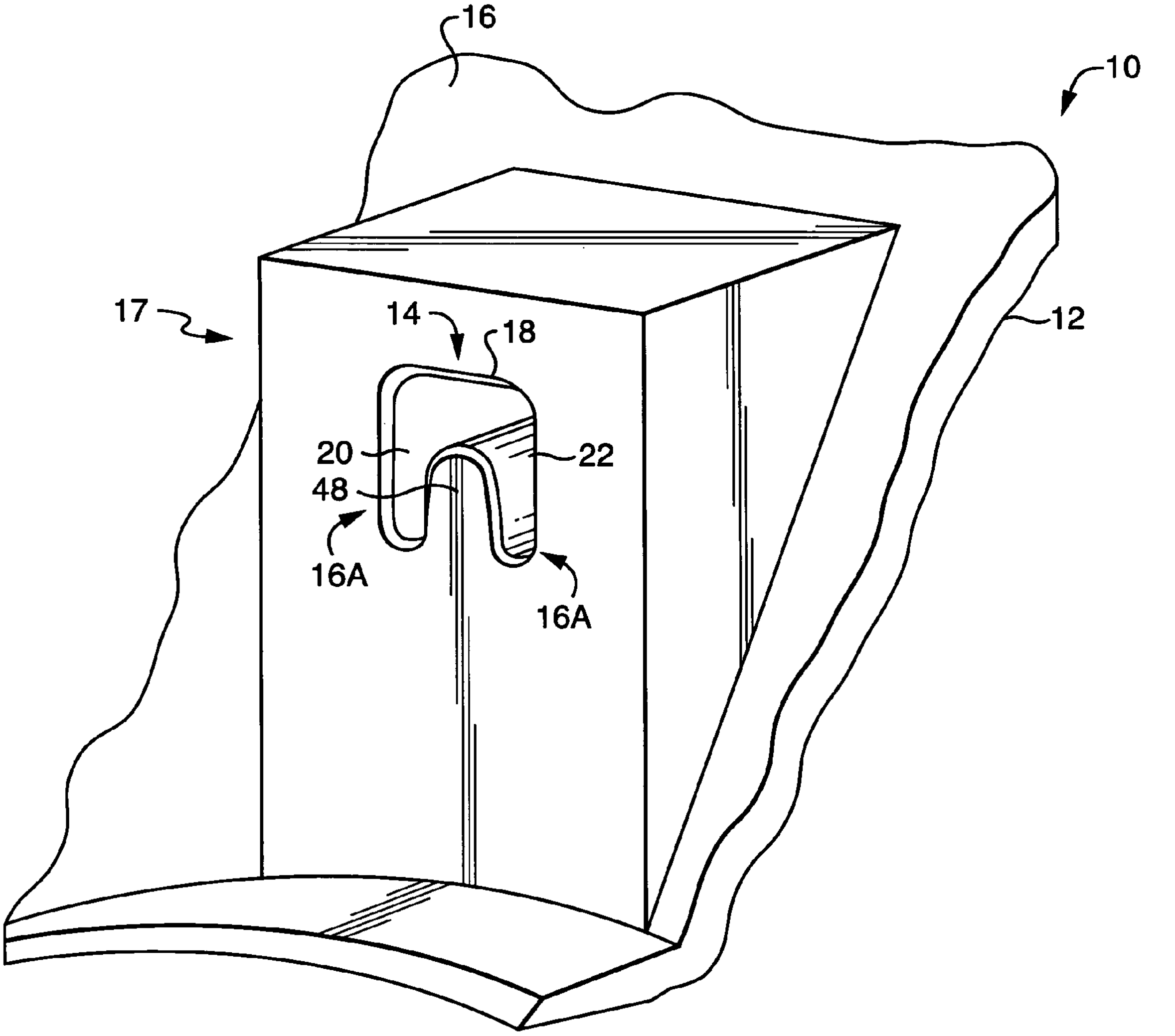
FIG. 4 is a perspective view of the rear surface of the aperture formed in the reflector.

A reflector 10 (see particularly FIGS. 2, 3, and 4) has a reflector surface 12 with an inverted U-shaped aperture 14 formed therein and extending through the reflector to an opposite surface 16. To provide an adequate length for nibs 32, 34, a housing 17 is formed with surface 16.

Figure 2:
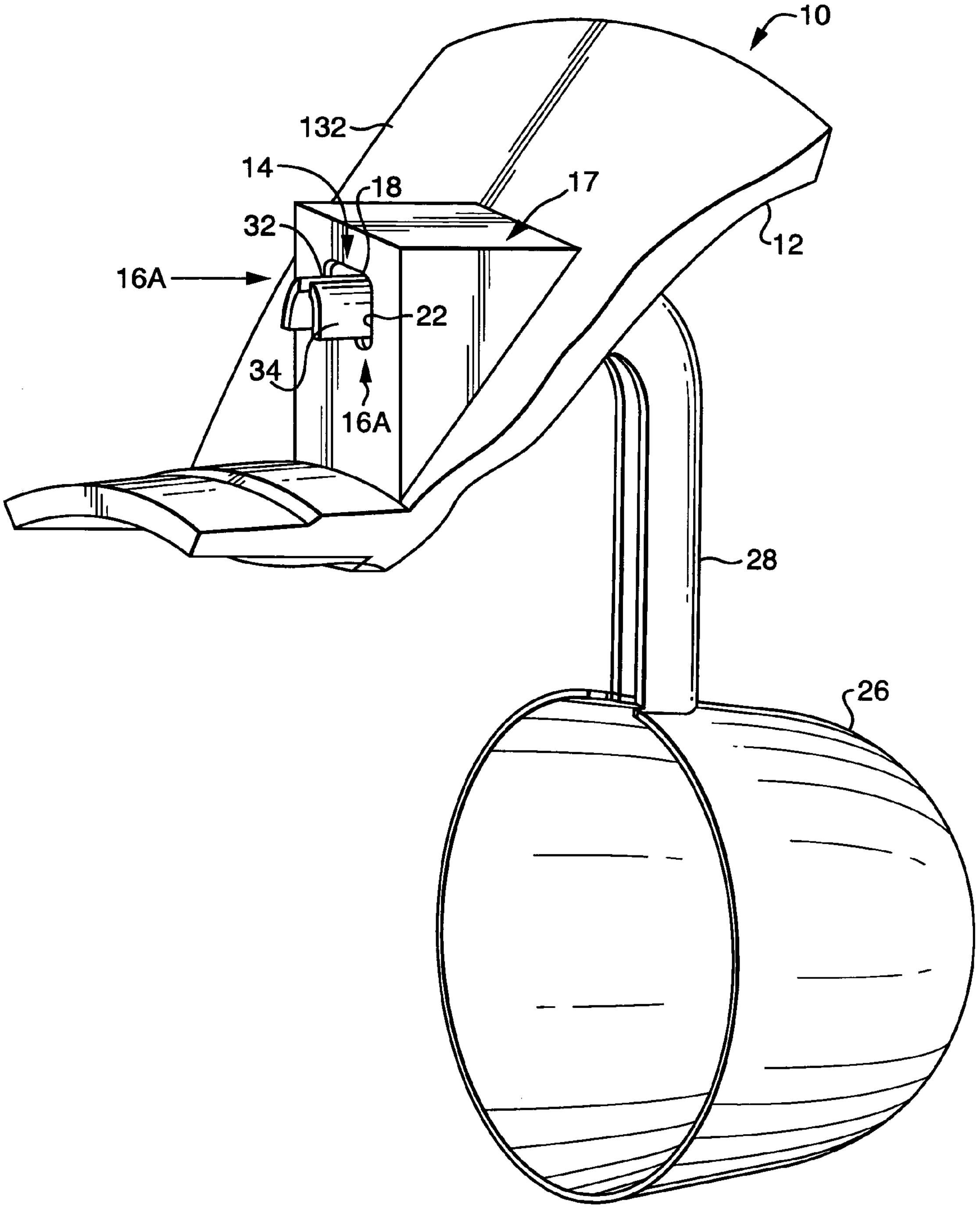
FIG. 2 is a perspective view of a shield first mounted to a reflector.

The inverted U-shaped aperture 14 has a bight 18 uppermost and channels 20, 22 depending therefrom to receive the nibs 32, 34, as shown in FIG. 2. Aperture 14 has an entrance side 12*a* and an exit side 16*a* and the entrance side 12*a* is provided with a stop 40 that limits the penetration of nibs 32 and 34 into the aperture 14. The stop 40 cooperates with mating stop edges 42, 43 formed on nibs 32, 34.

Figure 10:
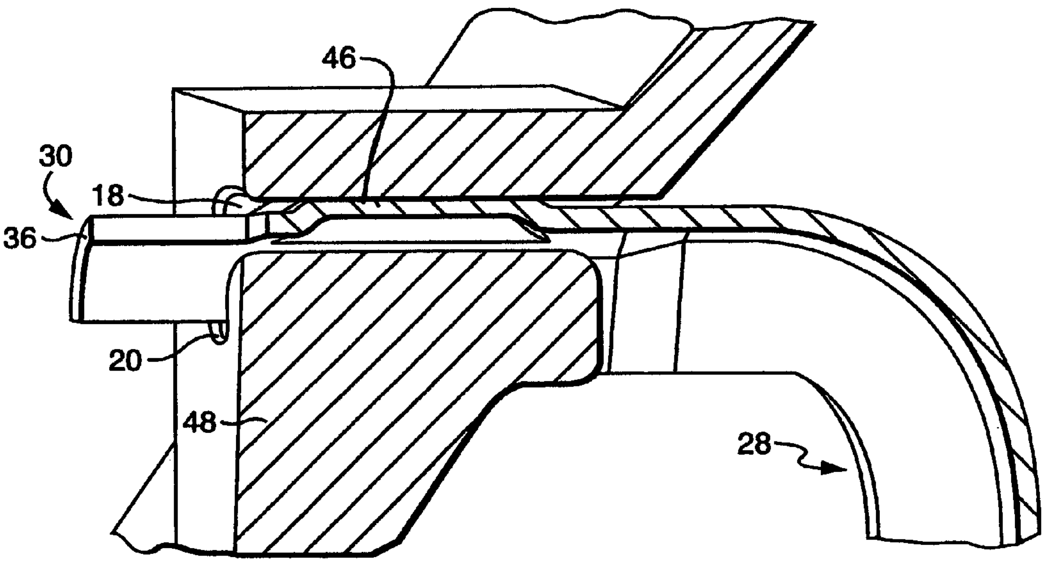
FIG. 10 is a perspective view, partially in section, of a spring element used for positioning the shield.

A transverse web 44 connects the nibs 32, 34 for a part of their length and is provided with a tensioning spring member 46. As shown in FIG. 10, when the nibs 32, 34 are inserted into the channels 20, 22, the tensioning spring 46 exerts pressure against the bight 18 and the rib 48 formed between the channels 20, 22, thereby accurately positioning the light-shield 24 with respect to the reflector 10.

Figure 5:
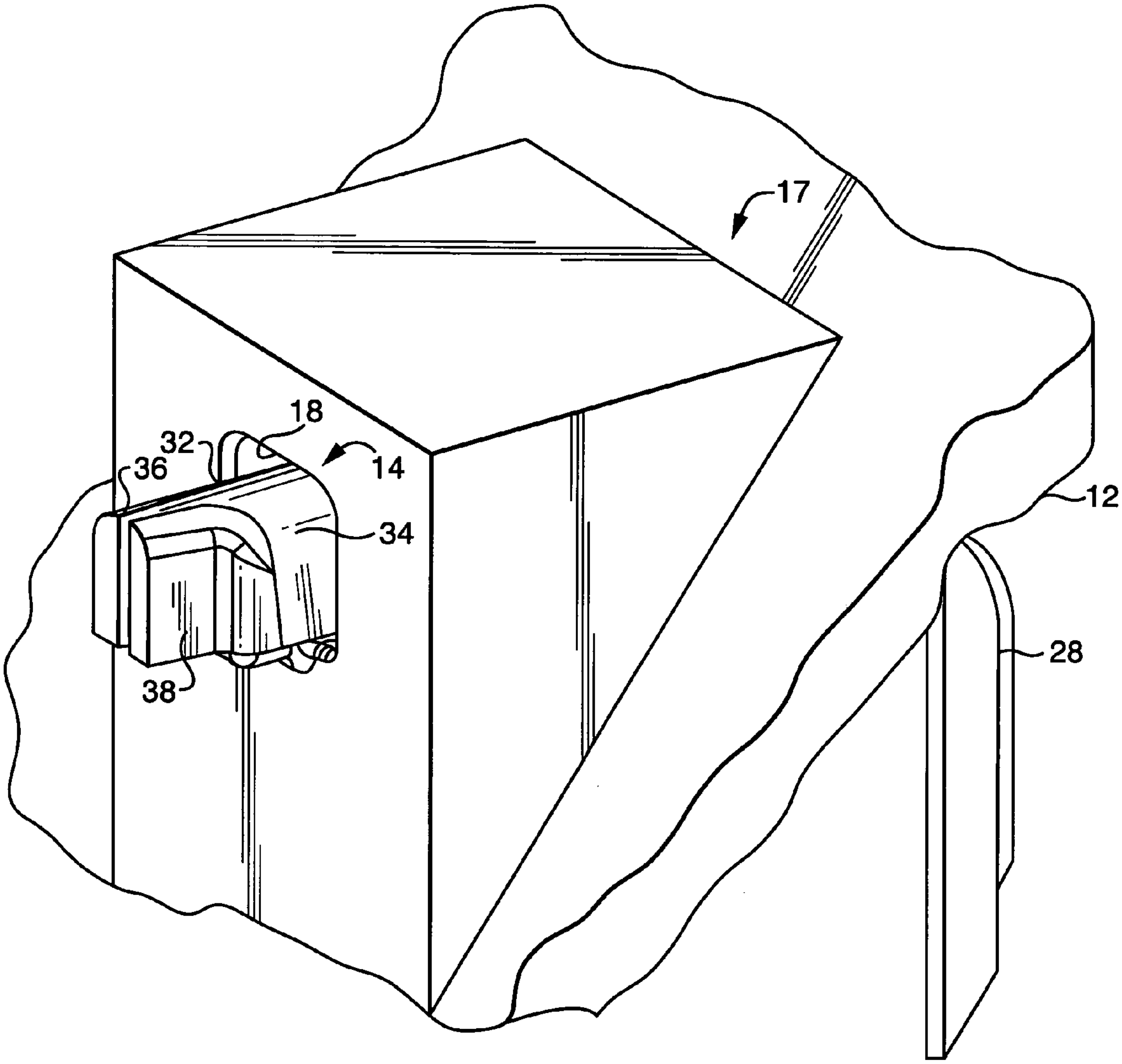
FIG. 5 is a perspective view of a first embodiment of deformation of the shield fixing means.
Figure 6:
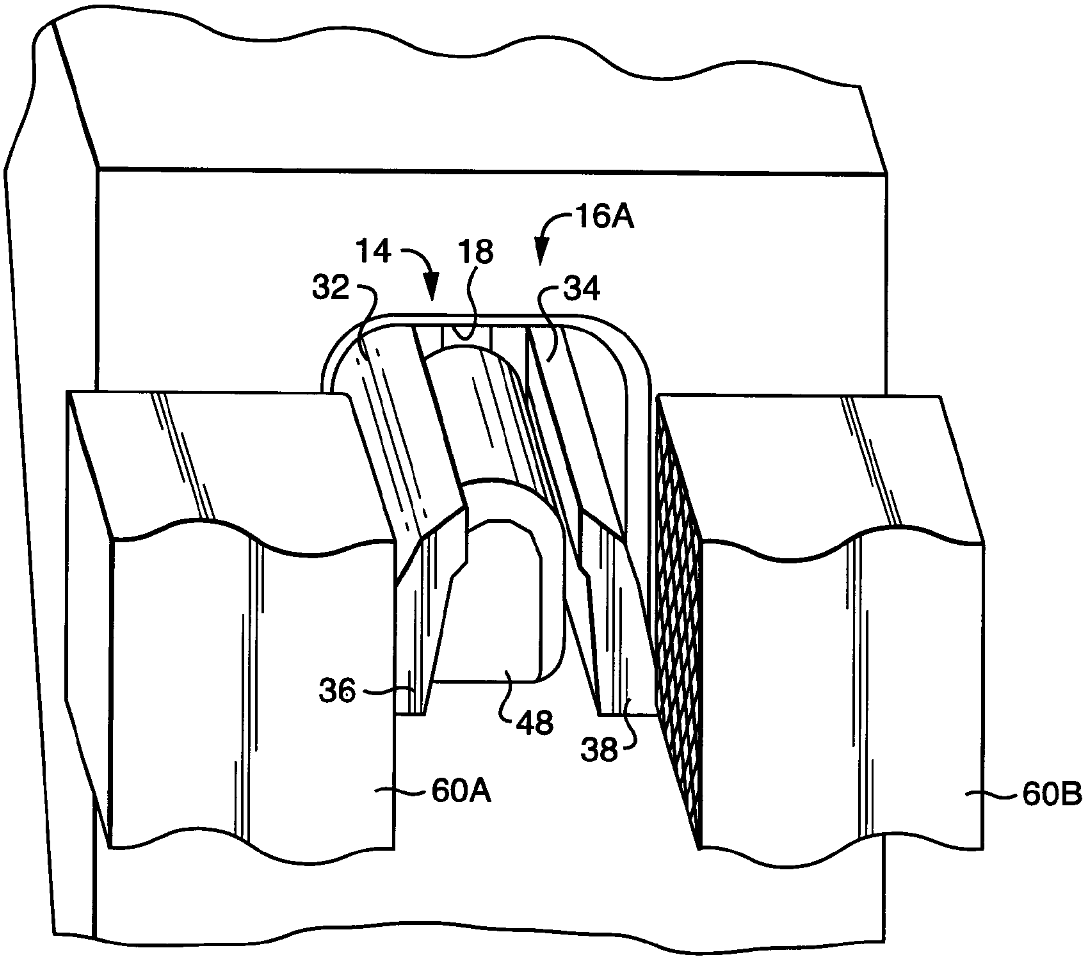
FIGS. 6 and 7 are diagrammatic perspective views of the sequence of operation for accomplishing the deformation of the first embodiment.
Figure 8:
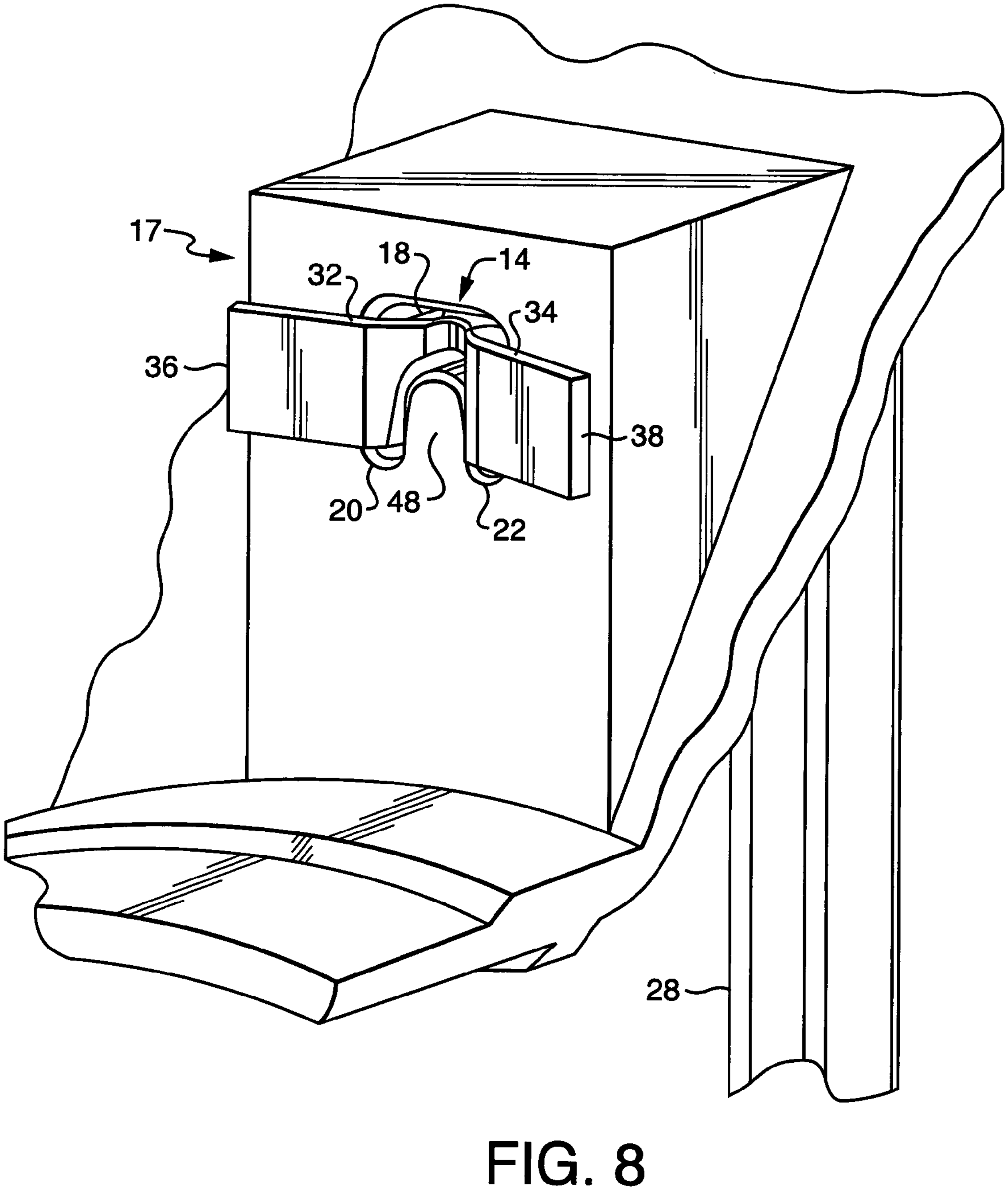
FIG. 8 is perspective view of a second embodiment of the deformation of the shield fixing means.

With light-shield 24 held in position by the tension between the spring member 46 and the bight 18 and the fit of the nibs 32, 34 in channels 20, 22, the ends 36, 38 of the nibs 32, 34 are deformed by compressing them inwardly toward the rib 48 as shown in FIGS. 5 and 6, or by deforming the nibs outwardly, away from the rib 48 as shown in FIG. 8.

Figure 7:
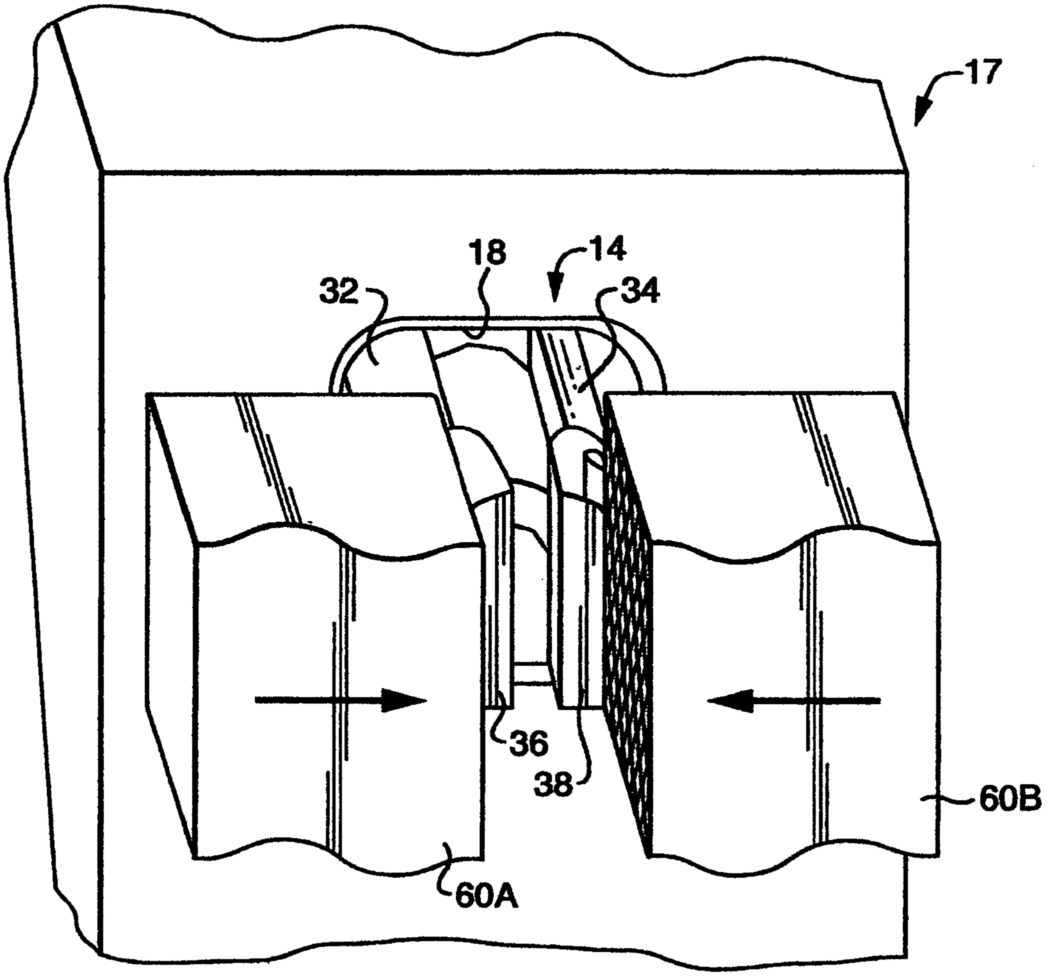
Figure 9:
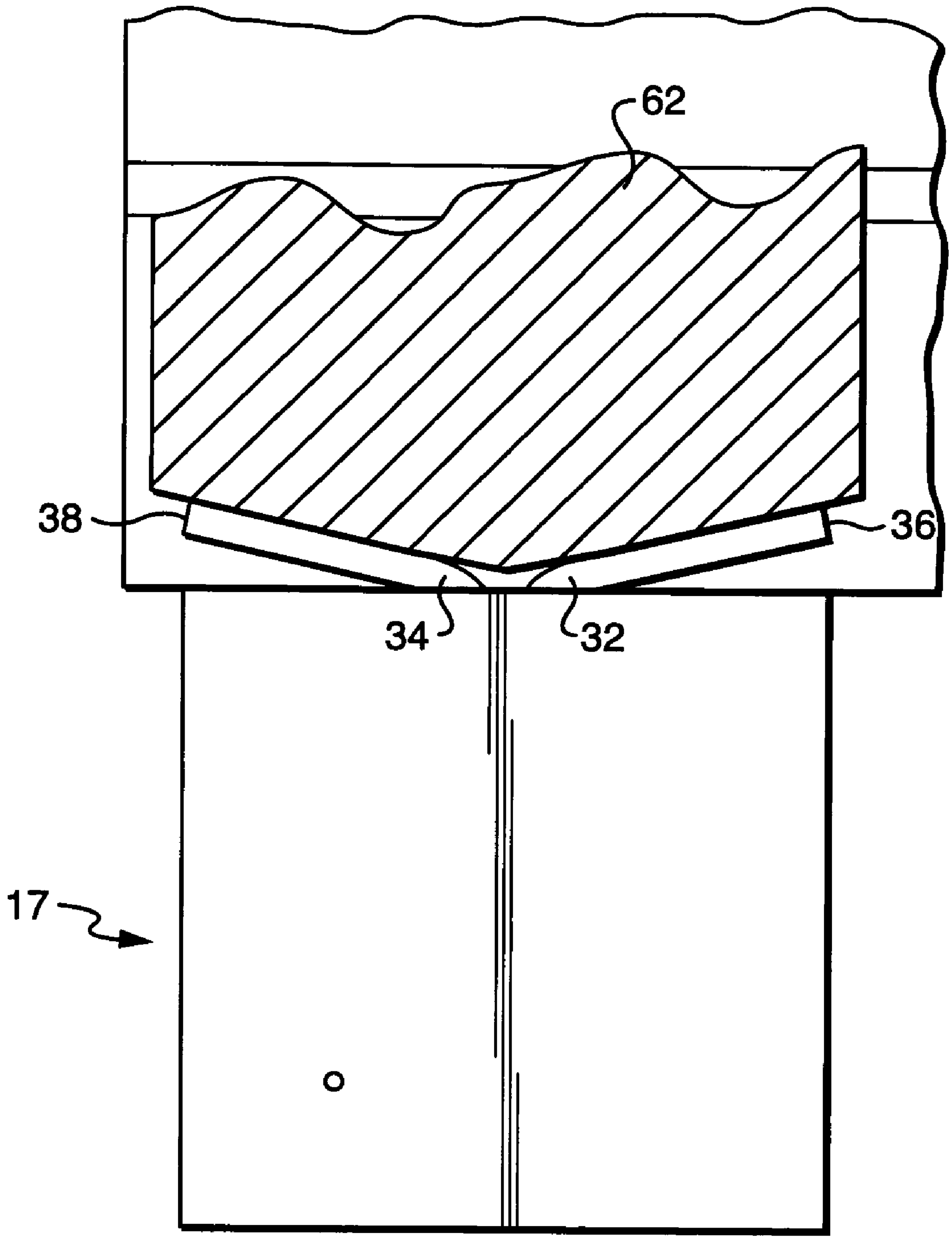
FIG. 9 is a diagrammatic plan view of the sequence of operation for accomplishing the deformation of the second embodiment.

FIGS. 6 and 7 illustrate the inward deformation performed by tools 60*a* and 60*b* while FIG. 9 illustrates the outward deformation performed by a tool 62.

In a preferred embodiment of the invention, the reflector material is unsaturated polyester and the light-shield material is 1008–1010 C.R.S.

This structure greatly enhances the operation of lamp units. The cooperation between the stop 40 and the stop-edge 42, 43, the fit between the nibs 32, 34 and the channels 20, 22, and the tension provided by the spring member 46 guaranty a proper initial location for the light-shield and the deformation of the ends of the nibs 32, 34 assures that the initial location remains.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A lamp unit comprising:

a reflector having a reflector surface with an inverted U-shaped aperture formed therein and extending through said reflector to an opposite surface, said inverted U-shaped aperture thereby having the bight uppermost with a pair of channels depending therefrom; and a light-shield comprising a cup-shaped member having an arm projecting therefrom, said arm having a distal end formed to provide a pair of nibs for engaging and penetrating said channels of said inverted U-shaped aperture and having their ends deformed to fix the position of said light-shield relative to said reflector.

2. The lamp unit of claim 1 wherein said nibs have their ends deformed outwardly.

3. The lamp unit of claim 1 wherein said nibs have their ends deformed inwardly.

4. The lamp unit of claim 1 wherein said inverted U-shaped aperture has an entrance side and an exit side and said entrance side is provided with a stop that cooperates with mating stop edges formed in said nibs and determines the degree of penetration of said nibs into said channels of said inverted U-shaped aperture.

5. The lamp unit of claim 1 wherein said nibs have a transverse bar connecting them for part of their length and said transverse bar is provided with a tensioning spring.

* * * * *